United States Patent
Matsui et al.

(10) Patent No.: US 10,444,428 B2
(45) Date of Patent: Oct. 15, 2019

(54) OPTICAL FIBER AND OPTICAL TRANSMISSION SYSTEM

(71) Applicant: NIPPON TELEGRAPH AND TELEPHONE CORPORATION, Tokyo (JP)

(72) Inventors: Takashi Matsui, Tsukuba (JP); Kyozo Tsujikawa, Tsukuba (JP); Fumihiko Yamamoto, Tsukuba (JP); Nobutomo Hanzawa, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/752,809

(22) PCT Filed: Mar. 3, 2016

(86) PCT No.: PCT/JP2016/056659
§ 371 (c)(1),
(2) Date: Feb. 14, 2018

(87) PCT Pub. No.: WO2017/047128
PCT Pub. Date: Mar. 23, 2017

(65) Prior Publication Data
US 2019/0004246 A1    Jan. 3, 2019

(30) Foreign Application Priority Data
Sep. 18, 2015 (JP) .................... 2015-185252

(51) Int. Cl.
*G02B 6/032* (2006.01)
*G02B 6/26* (2006.01)
(Continued)

(52) U.S. Cl.
CPC .......... *G02B 6/02347* (2013.01); *G02B 6/02* (2013.01); *G02B 6/032* (2013.01); *G02B 6/42* (2013.01); *G02B 6/4206* (2013.01); *B23K 26/702* (2015.10)

(58) Field of Classification Search
CPC ............ G02B 6/02042; G02B 6/02347; G02B 6/02323; G02B 6/02352; G02B 6/02366; G02B 6/4206; B23K 26/702
(Continued)

(56) References Cited

U.S. PATENT DOCUMENTS

2005/0157998 A1    7/2005  Dong et al.
2006/0093296 A1 *  5/2006  Jin ..................... G02B 6/02047
                                                                385/125
(Continued)

FOREIGN PATENT DOCUMENTS

CN    101408641    4/2009
CN    102213792    10/2011
(Continued)

OTHER PUBLICATIONS

Dianov et al., "Solid-Core Photonic Bandgap Fibers for High-Power Fiber Lasers", IEEE Journal of Selected Topics in Quantum Electronics, IEEE Service Center, Piscataway, NJ, US, vol. 15, No. 1, Jan. 1, 2009 (Jan. 1, 2009), 11 pages.
(Continued)

*Primary Examiner* — Kaveh C Kianni
*Assistant Examiner* — Hung Q Lam
(74) *Attorney, Agent, or Firm* — Ohlandt, Greeley, Ruggiero & Perle, L.L.P.

(57) ABSTRACT

An optical fiber that is a photonic crystal fiber in which a plurality of holes is arranged along a longitudinal direction of the optical fiber, having a predetermined bending radius R determined according to a transmission distance L of the
(Continued)

optical fiber and optical power output from the optical fiber, and having an inter-hole distance $\Lambda$ and a ratio $d/\Lambda$ between a hole diameter d and the inter-hole distance $\Lambda$ such that light of a predetermined number of modes is transmitted and a bending loss of the light of a fundamental mode with the predetermined bending radius R is equal to or smaller than a predetermined value.

16 Claims, 20 Drawing Sheets

(51) Int. Cl.
*G02B 6/44* (2006.01)
*G02B 6/00* (2006.01)
*G02B 6/036* (2006.01)
*G02B 6/02* (2006.01)
*G02B 6/42* (2006.01)
*B23K 26/70* (2014.01)

(58) Field of Classification Search
USPC .......... 385/25, 100, 109, 112, 119, 122, 385/125–127
See application file for complete search history.

(56) References Cited

U.S. PATENT DOCUMENTS

| | | | |
|---|---|---|---|
| 2010/0157418 A1 | 6/2010 | Dong et al. | |
| 2011/0123149 A1* | 5/2011 | Hemenway, Jr. | G02B 6/4236 385/32 |
| 2012/0134636 A1 | 5/2012 | Tsuchida et al. | |
| 2013/0084077 A1 | 4/2013 | Mukasa | |
| 2014/0212103 A1 | 7/2014 | Taunay | |

FOREIGN PATENT DOCUMENTS

| | | |
|---|---|---|
| CN | 102375176 | 3/2012 |
| CN | 102435986 | 5/2012 |
| EP | 2765443 A1 | 8/2014 |
| JP | 5059797 | 10/2012 |
| JP | 2014-49763 A | 3/2014 |
| JP | 2014-119558 A | 6/2014 |
| WO | 2011/115146 A1 | 9/2011 |
| WO | 2013/051295 A1 | 4/2013 |

OTHER PUBLICATIONS

Extended European Search Report dated Apr. 5, 2018 from corresponding European Patent Application No. 16779871.9, 8 pages.
International Preliminary Report on Patentability dated Mar. 20, 2018 in corresponding PCT International Application No. PCT/JP2016/056659, 15 pages.
Himeno, "Basics and Features of High-Power Fiber Laser", Fujikura Technical Journal, vol. 1, pp. 1-6, Jan. 2014, partial English translation.
Yamasaki et al., "10 kW Long-length Cables for Laser Transmission Incorporated with Eight Optical Fibers", Mitsubishi Cable Industries Review, No. 105, pp. 24-27, Oct. 2008, partial English translation.
Kasahara et al., "A Study on 2 Mode Holey Fibers with Large Effective Area", 2013 Nen the Institute of Electronics, Information and Communication Engineers SogoTaikai Koen Ronbunnnshu, Mar. 5, 2013, Tsushin 2, p. 476, partial English translation.
Jitsumu ni Yakudatsu Hikari Fiber Gijutsu 200 no Point, revised edition 3rd Print, The Telecommunications Association, Jul. 10, 1998, p. 225, partial English translation.
International Search Report dated Mar. 29, 2016 from corresponding International PCT Application PCT/JP2016/056659, 2 pages.
Japanese Office Action dated Feb. 27, 2018 in related Japanese Application No. JP 2017-512248, 9 pages.
Mafi et al., "Beam Quality of Photonic-Crystal Fibers", Journal of Lightwave Technology, Jul. 7, 2005, vol. 23, No. 7, pp. 2267-2270.
Japanese Office Action dated Oct. 2, 2018 in related Japanese Patent Application No. 2017-512246, 4 pages.
Japanese Office Action dated Sep. 25, 2018 in corresponding Japanese Patent Application No. 2017-540526, 9 pages.
Japanese Office Action dated Jul. 17, 2018 from corresponding Japanese Patent Application 2017-540526, 7 pages.
First Chinese Office Action dated May 5, 2019 in corresponding Chinese Patent Application No. 201880000912.5, 13 pages.
Extended European Search Report dated May 29, 2019 in corresponding European Patent Application No. 16846001.2, 8 pages.

* cited by examiner

OPTICAL FIBER AND OPTICAL TRANSMISSION SYSTEM

BACKGROUND

1. Field of the Disclosure

The present disclosure relates to high-power optical transmission using an optical fiber.

2. Discussion of the Background Art

Along with progress of high-output lasers, application to industrial processing such as welding using laser light is widely used. Especially, in recent years, high-output fiber lasers with an output of as high as 10 kW are developed and are expected to be used in medical and industrial fields. With such high-output fiber lasers, for example, as disclosed in Non Patent Literature 1, a core area is expanded in a short optical fiber of several meters or shorter, so that output power limitation due to non-linearity is relaxed. In laser processing, a beam quality of emitted light significantly affects processing efficiency. Since the beam quality strongly depends on a mode state of the emitted light, an optical fiber enabling single mode transmission is used in the fiber laser.

Furthermore, as disclosed in Non Patent Literature 2, an optical fiber is connected to an emission end of the above-described high-output laser to be applied to remote welding processing. In this case, the beam quality at the emission end is affected by an excitation state of a high-order mode in the connected optical fiber. Therefore, if a multimode optical fiber with a large core area is connected as a transmission optical fiber, high-power light of several kW may be transmitted over several tens of meters or longer, but the beam quality at the emission end is low. In order to improve the beam quality, it is necessary to reduce the number of propagation modes, but generally, in a structural design of the optical fiber, there is a trade-off relationship between the reduction in the number of propagation modes and the expansion of the core area, so that the power which may be transmitted is limited.

CITATION LIST

Non Patent Literature

Non Patent Literature 1: Himeno, "Basics and Features of High-Power Fiber Laser", Fujikura Technical Journal, Vol. 1, pp. 1-6, January 2014

Non Patent Literature 2: Yamasaki et al., "10 kW Long-length Cables for Laser Transmission Incorporated with Eight Optical Fibers", MITSUBISHI CABLE INDUSTRIES Review, No. 105, pp. 24-27, October 2008

As described above, in the conventional optical fiber, there is a trade-off relationship between improvement in output beam quality and an increase in output light power or extension of a transmission distance, and there is a problem that high-output and high-quality high-power light cannot be obtained.

SUMMARY

In the optical fiber of the present disclosure, the number of modes that can be propagated using a photonic crystal fiber is set to be a LP21 mode or lower order modes, an axial shift amount between a central axis of a laser oscillating unit and a central axis of the photonic crystal fiber is set to be a certain amount or smaller, and a predetermined bending radius is set for arbitrary output light power and transmission distance, thereby solving the problem.

Herein, as represented by expression (2), maximum output light power $P_{th}$ for preventing stimulated Raman scattering and an effective interaction length $L_{eff}$ are in an inverse relationship. In a case where an optical fiber has a relatively short transmission distance of 1 km or shorter, $L_{eff}$ and a transmission distance L have equivalent values. In this case, an output light power performance may be represented by a product (kW·m) of the output light power and the transmission distance. Meanwhile, the transmission distance is not limited to 1 km or shorter, and it may be similarly applied as long as $L_{eff}$ and L may be regarded as equivalents.

[Expression 2]

$$P_{th} = \frac{16 A_{eff}}{g_R L_{eff}} \text{ wherein,} \qquad (2)$$

$P_{th}$ represents SRS threshold, $L_{eff}$ represents effective interaction length expressed by $$L_{eff} = \frac{1 - \exp(-\alpha_p L)}{\alpha_p}$$

$\alpha$ represents transmission loss expressed by $\alpha_p = \frac{\alpha}{4.343}$ $g_R$ represents Raman gain coefficient.

Specifically, an optical fiber according to the present disclosure is an optical fiber in which a plurality of holes is arranged along a longitudinal direction of the optical fiber and a region surrounded by the plurality of holes is formed as a core region, the optical fiber having a predetermined bending radius determined according to a transmission distance of the optical fiber and light power output from the optical fiber, and an inter-hole distance of the plurality of holes and a ratio between a hole diameter of the plurality of holes and the inter-hole distance such that light of a predetermined number of modes is transmitted and a bending loss of light of a fundamental mode with the predetermined bending radius becomes a predetermined value or smaller.

An effective cross-sectional area $A_{eff}$ of the optical fiber and the predetermined bending radius R may have a relationship represented by following expression (1). Herein, a coefficient a may be 6.6 or larger and 6.9 or smaller, and a coefficient b may be 0.97 or larger.

The predetermined bending radius may be 500 mm or smaller, a hole defect corresponding to one hole forming the core region may be included in the plurality of holes, the inter-hole distance between the plurality of holes may be 60 μm or smaller, and the ratio between the hole diameter of the plurality of holes and the inter-hole distance may be 0.78 or smaller.

The predetermined bending radius may be 500 mm or smaller, a hole defect corresponding to seven holes forming the core region may be included in the plurality of holes, the inter-hole distance between the plurality of holes may be 28.5 μm or smaller, and the ratio between the hole diameter of the plurality of holes and the inter-hole distance may be 0.55 or smaller.

The number of the plurality of holes may be 18 or smaller.

For example, the number of the plurality of holes may be 12, the inter-hole distance between the plurality of holes may be 50 μm or larger and 65 μm or smaller, and the ratio of the hole diameter of the plurality of holes to the inter-hole distance may be 0.79 or larger and 0.88 or smaller.

The light of the predetermined number of modes may be the light including a LP01 mode, a LP11 mode, and a LP21 mode but not including a LP02 mode.

The light of the predetermined number of modes may be the light including a LP01 mode and a LP11 mode but not including the LP21 mode and a higher order mode.

The predetermined value may be 1 dB/km.

Specifically, an optical fiber according to the present disclosure is provided with the optical fiber according to the present disclosure, a light source that emits light transmitted by the optical fiber, and a coupling unit that sets an axial shift amount between a central axis of emitted light from the light source and a central axis of the core region to 0.95 or smaller with respect to a mode field radius of the optical fiber.

Meanwhile, the above-described disclosures may be combined as much as possible.

Advantageous Effects of Disclosure

An optical fiber of the present disclosure has an effect of obtaining high-beam quality and high-output output light as compared to that of the conventional optical fiber by setting a bending radius to a predetermined value in a photonic crystal fiber.

DETAILED DESCRIPTION OF THE PREFERRED EMBODIMENT

Figure 1:
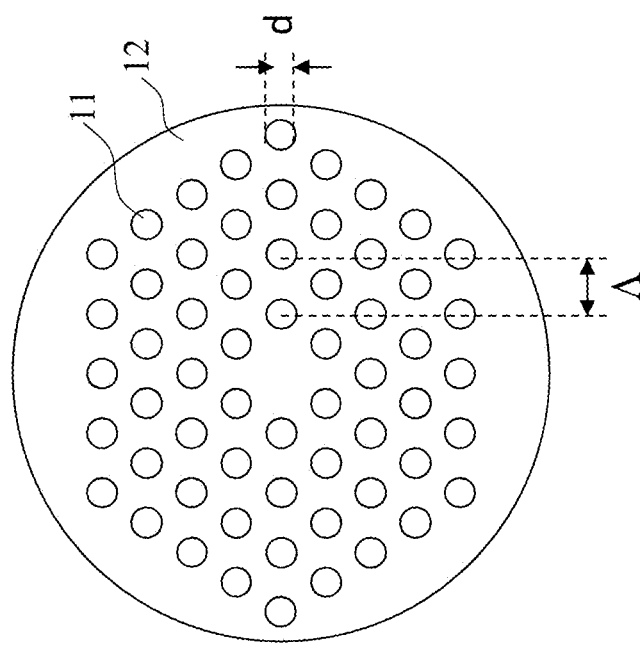
FIG. 1 is a schematic diagram illustrating a first structural example of a high-power optical transmission optical fiber according to an embodiment.

Hereinafter, embodiments of the present disclosure are described in detail with reference to the drawings. Meanwhile, the present disclosure is not limited to the embodiments described below. These embodiments are merely examples, and the present disclosure may be implemented in modes with various modifications and improvements based on knowledge of those skilled in the art. Meanwhile, components assigned with the same reference numeral in this specification and the drawings indicate the same components.

Figure 2:
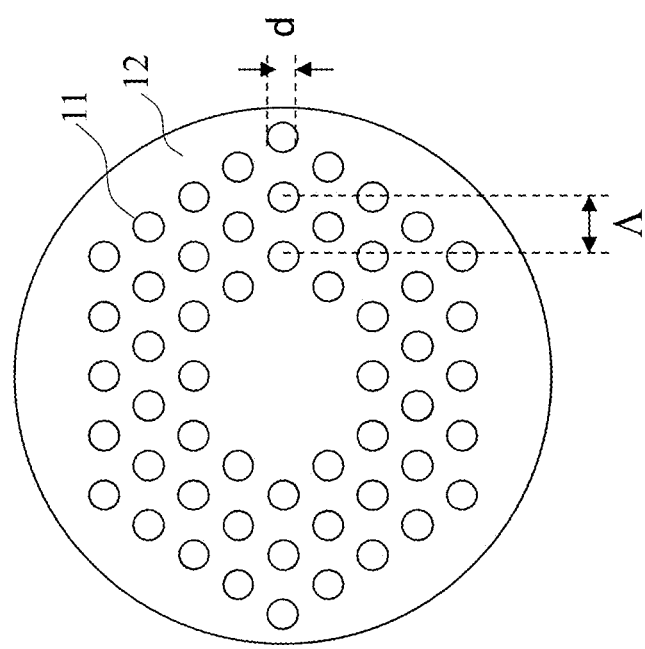
FIG. 2 is a schematic diagram illustrating a second structural example of the high-power optical transmission optical fiber according to the embodiment.
Figure 3:
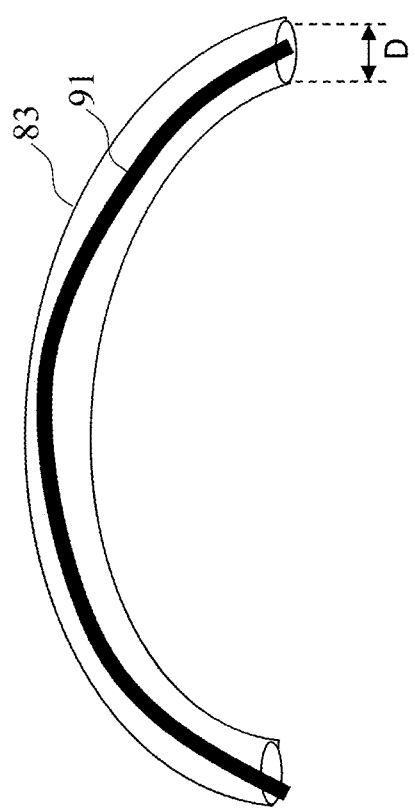
FIG. 3 is a schematic diagram illustrating an optical fiber cable according to the embodiment.

FIGS. 1 to 3 illustrate structural examples of a high-power optical transmission optical fiber according to the embodiment. The high-power optical transmission optical fiber according to this embodiment uses a photonic crystal fiber (PCF) having a plurality of holes along a longitudinal direction of the optical fiber as represented by FIG. 1 or FIG. 2. FIGS. 1 and 2 illustrate first and second structural examples of the high-power optical transmission optical fiber according to this embodiment, respectively. An optical fiber cable 83 according to the embodiment is provided with two or more optical fibers and at least one of the two or more optical fibers is the high-power optical transmission optical fiber according to this embodiment as illustrated in FIG. 3.

In FIGS. 1 and 2, a plurality of holes is arranged in a hexagonal close-packed manner in a uniform material (for example, pure quartz), and a hole defect is arranged at the center to make a region with the hole defect a core region in which an optical wave propagates. FIG. 1 illustrates an example in which one hole defect is arranged at the center, and FIG. 2 illustrates an example in which seven hole defects are arranged at the center.

In order to avoid an increase in the number of propagation modes accompanying with core region expansion (that is, deterioration in output optical beam quality), a high-power optical transmission optical fiber 91 according to this embodiment sets a bending radius when a cable is obtained as illustrated in FIG. 3 to a predetermined value. As a result, the high-power optical transmission optical fiber according to this embodiment simultaneously realizes the core region expansion and limitation of the number of propagation modes, thereby realizing high-quality and high-power output light.

Meanwhile, although a predetermined lower limit value may be determined in operation when setting the bending radius, it is preferable to select as a covering of the optical fiber cable 83 a material having rigidity such that this does not bend so as to excess a predetermined bending radius. At that time, as for the bending radius of the high-power optical transmission optical fiber 91, it is preferable to take bending in the optical fiber cable 83 into consideration in addition to a bending radius R of the optical fiber cable 83 itself. In this case, note that it is R+D/2 with respect to an outer diameter D of the optical fiber cable 83.

Figure 4:
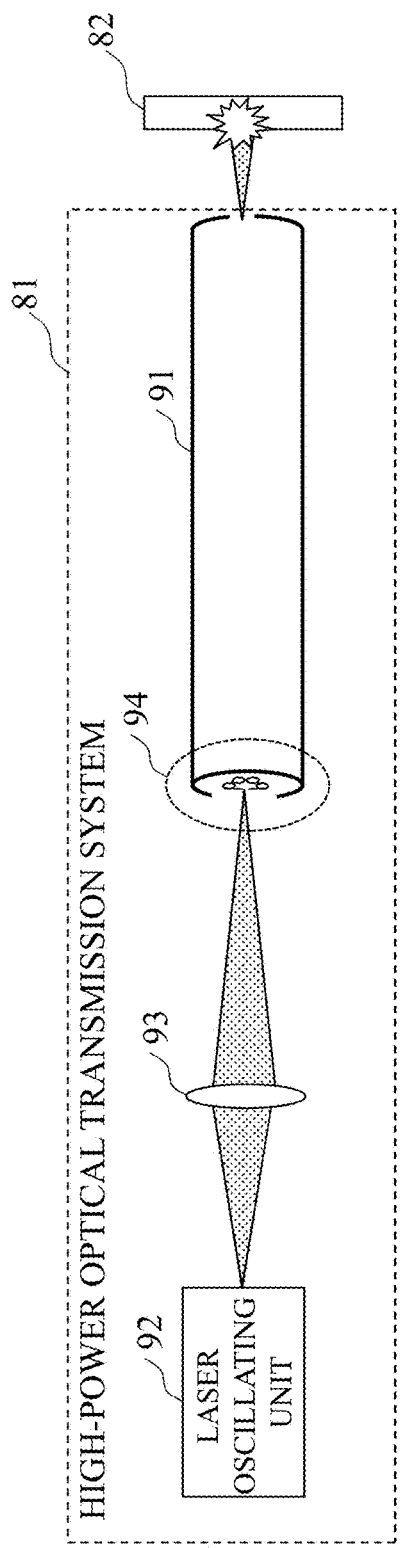
FIG. 4 illustrates an example of a high-power optical transmission system according to the embodiment.

Herein, as illustrated in FIG. 4, the high-power optical transmission system in this embodiment includes a laser oscillating unit 92, a coupling unit 94 for allowing emitted light from the laser oscillating unit 92 to be incident on the high-power optical transmission optical fiber 91, and the high-power optical transmission optical fiber 91 for guiding an incident optical wave. In order to increase coupling efficiency in the coupling unit 94, a lens 93 for controlling an incident angle may be inserted between the laser oscillating unit 92 and the coupling unit 94.

Figure 5:
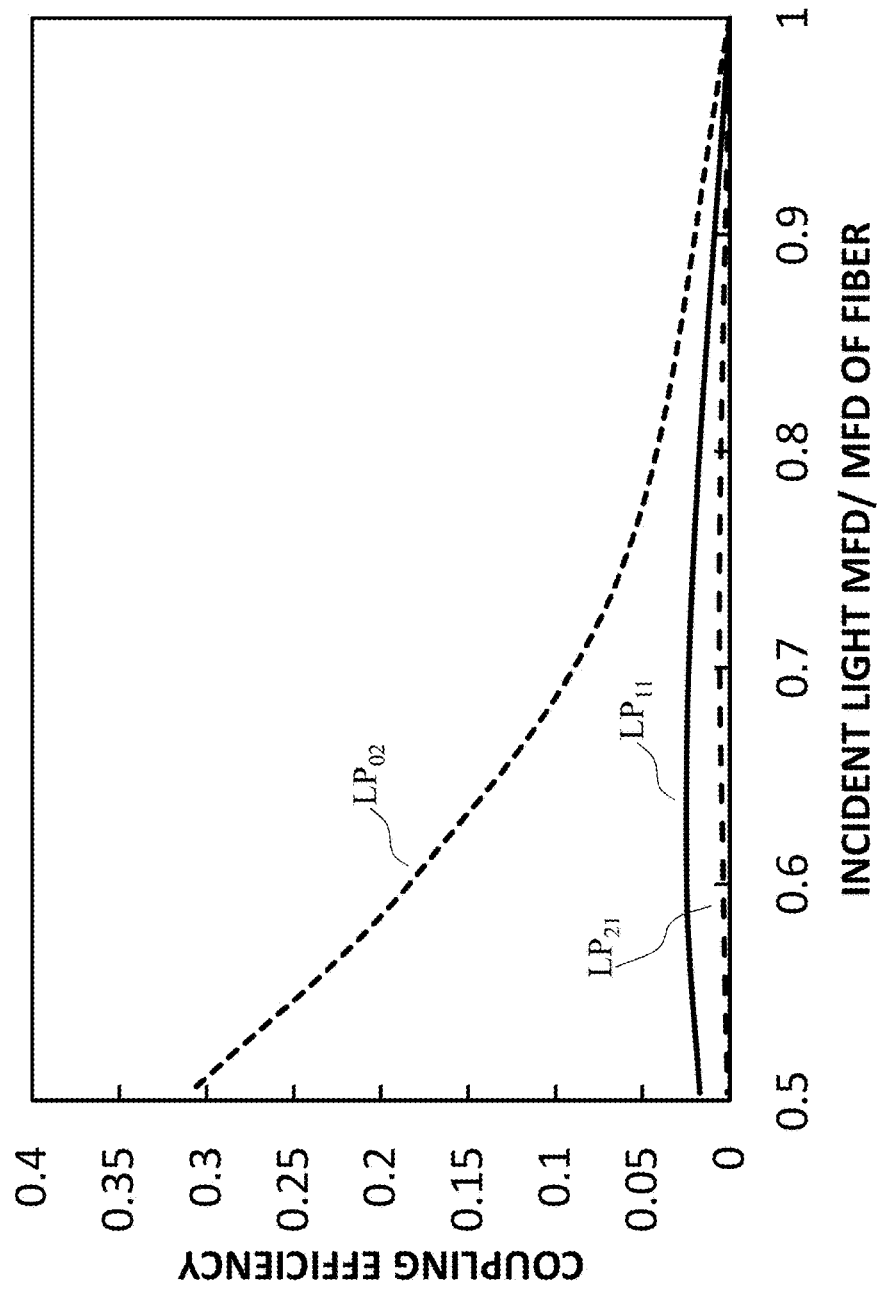
FIG. 5 is a characteristic diagram illustrating an example of coupling efficiency with respect to a high-order mode due to MFD mismatch.

FIG. 5 illustrates the coupling efficiency due to mode field diameter (MFD) mismatch between the incident light and the photonic crystal fiber. The coupling efficiency from a LP01 mode which is a fundamental mode to LP11, LP21, and LP02 modes is plotted along a vertical axis. A ratio of a beam diameter of the incident light to the MFD of the photonic crystal fiber is plotted along a horizontal axis. In a case where there is no MFD mismatch, that is, in a case where a value on the horizontal axis is "1", under an ideal condition without other disturbance such as angular shift, all is coupled to the LP01 mode, so that the beam quality is not deteriorated. However, in general, it is extremely rare that the beam diameter of the incident light and the MFD of the photonic crystal fiber are completely identical to each other. In a case where there is the MFD mismatch, the coupling efficiency for the LP11 and LP21 modes is significantly small such as 0.05 or smaller. This is because electric field distribution of the LP11 mode and the LP21 mode does not have a component in the vicinity of the center of the optical fiber, so that no coupling with the incident light occurs.

On the other hand, as for the LP02 mode having the electric field distribution similar to that of the fundamental mode, the coupling efficiency increases due to the MFD mismatch, and this causes the deterioration in beam quality. Therefore, in the high-power optical transmission optical fiber 91 and the transmission system of this embodiment, the photonic crystal fiber having a structure in which the LP02 mode does not propagate is adopted in order to avoid the deterioration in output optical beam quality. As a result, the high-power optical transmission optical fiber 91 and the transmission system of this embodiment may stably obtain high-quality output light without depending on a degree of the MFD mismatch between the incident light from the laser oscillating unit 92 and the transmission optical fiber 91.

Figure 6:
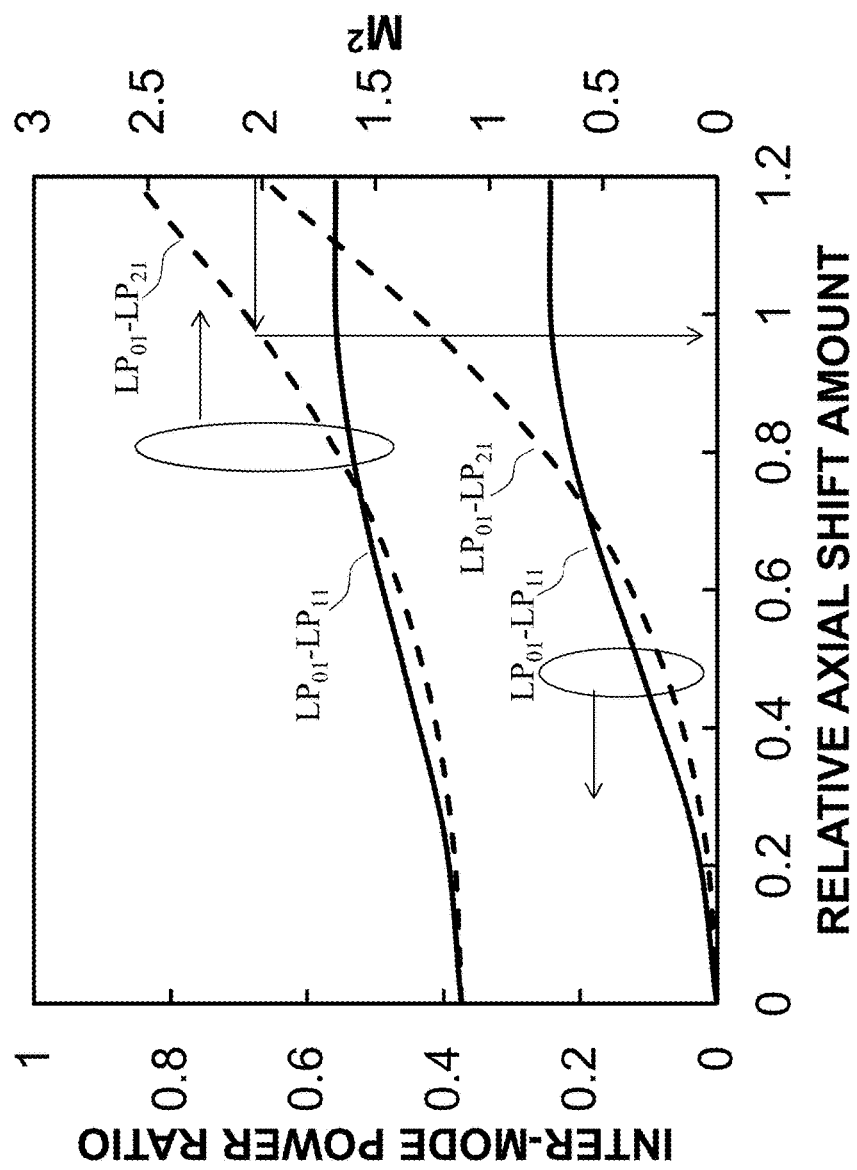
FIG. 6 is a characteristic diagram illustrating an example of an inter-mode power ratio due to axial shift.

FIG. 6 illustrates a change in an inter-mode power ratio and $M^2$ representing the beam quality of the emitted light due to an axial shift. An axial shift amount of the center of the incident light from the center of the fiber is plotted along the horizontal axis. Herein, this is expressed by a relative value with respect to a mode field radius of the LP01 mode. The inter-mode power ratio indicates the power ratio of the LP11 mode or LP21 mode to the LP01, that is, the coupling efficiency between the modes.

Since the LP11 and LP21 modes have peaks at positions shifted from the fiber center, the coupling efficiency of these high-order modes increases due to the axial shift, and as a result, the beam quality is deteriorated. In order to avoid the deterioration in output optical beam quality (increase in $M^2$) due to these high-order modes, for example, in order to make $M^2$ not larger than 2.0, it is necessary to set a relative axial shift amount to 0.95 or smaller.

Figure 7:
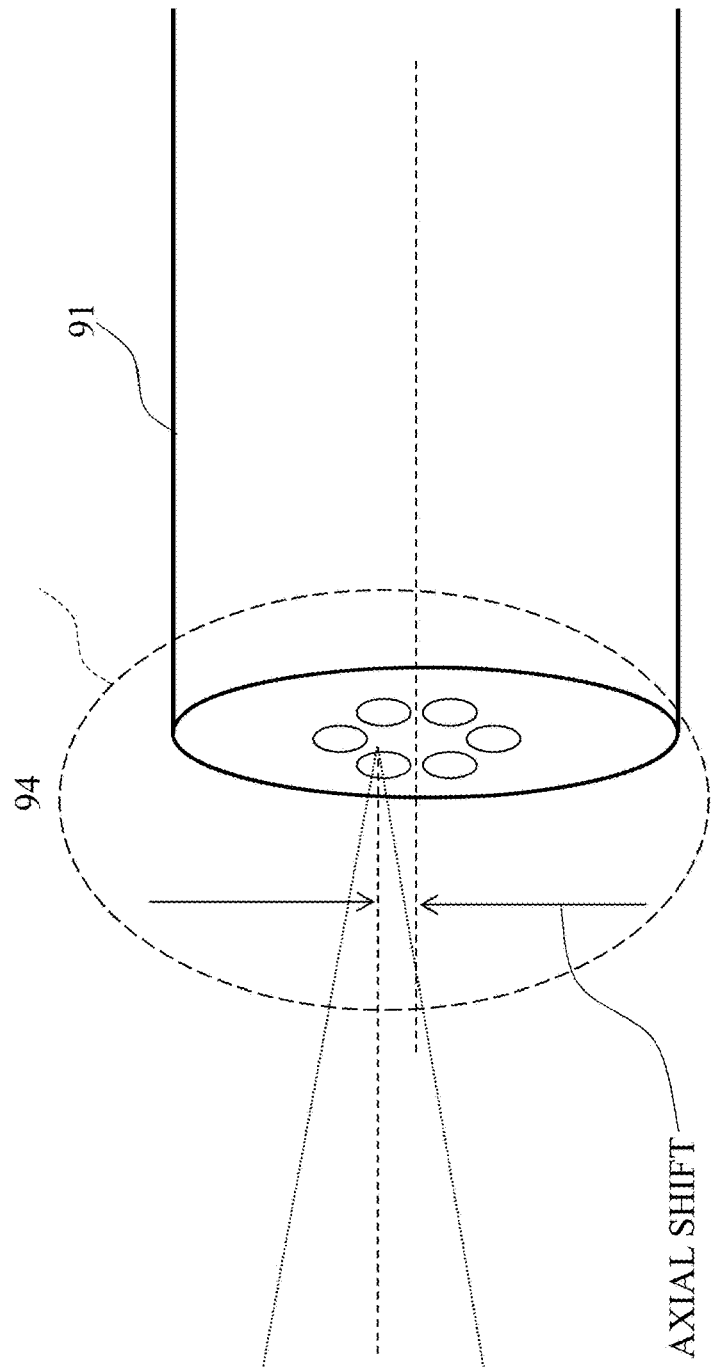
FIG. 7 illustrates an example of an enlarged view of a coupling unit in the high-power optical transmission system of the embodiment.

Therefore, in the high-power optical transmission system of this embodiment, as illustrated in FIG. 7, in the coupling unit 94, the axial shift amount between a central axis of the laser oscillating unit 92, that is, an optical axis of the output light of the laser oscillating unit 92 and a central axis of the core region of the high-power optical transmission optical fiber 91 is set to 0.95 or smaller with respect to the mode field radius of the high-power optical transmission optical fiber 91. As a result, the high-power optical transmission system of this embodiment may obtain extremely high-quality output light with $M^2$ of 2.0 or smaller.

Figure 8:
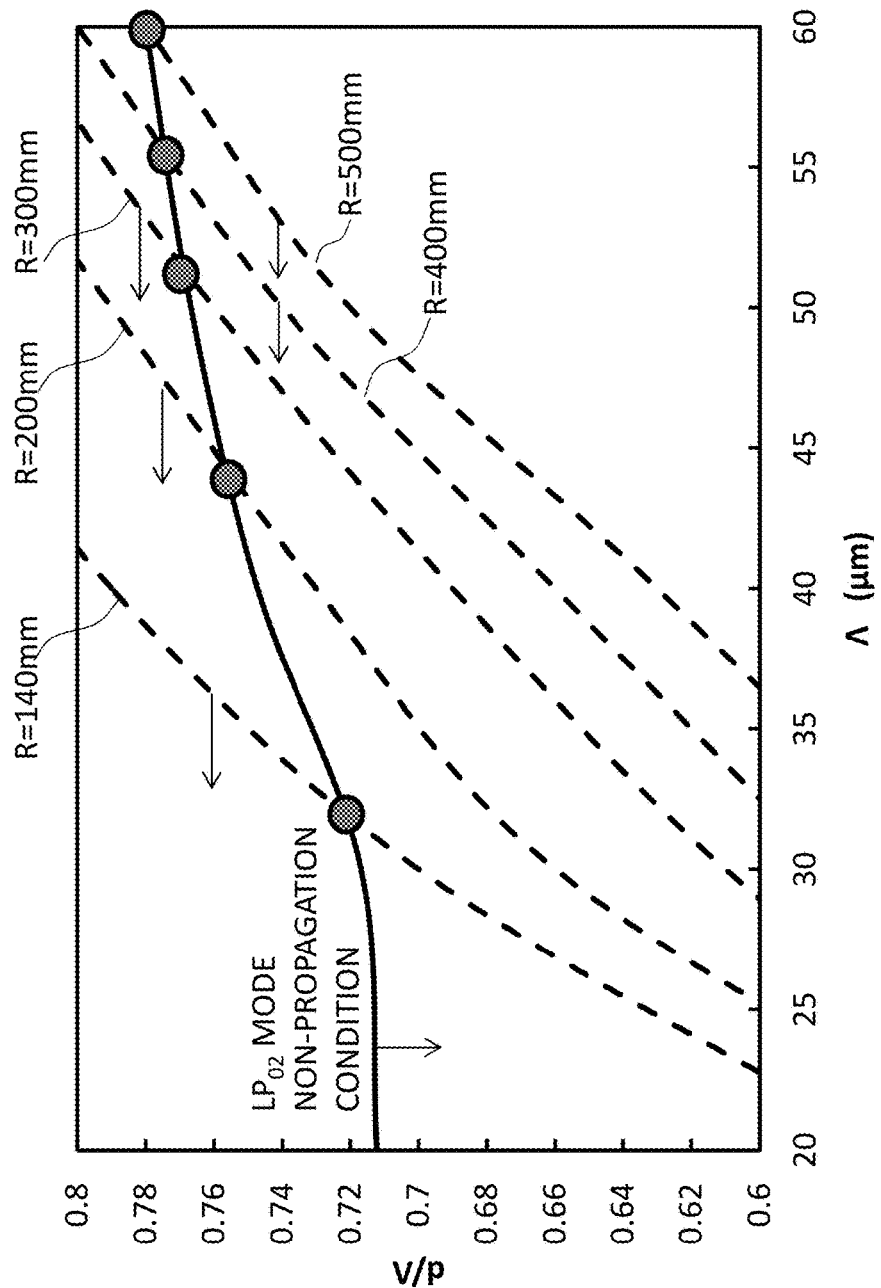
FIG. 8 illustrates an example of a structural condition of a PCF according to a first structural example of the high-power optical transmission optical fiber of the embodiment.
Figure 9:
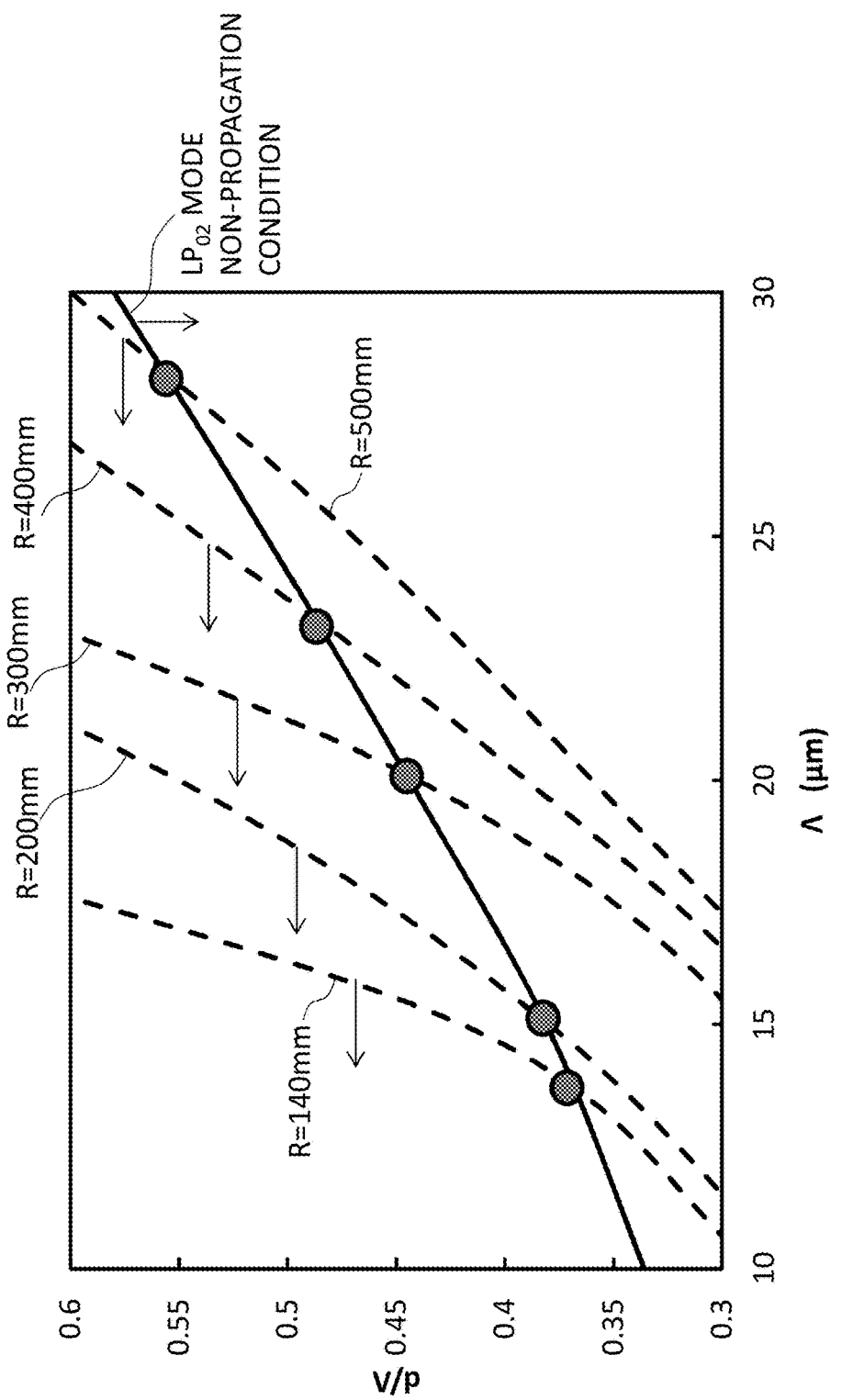
FIG. 9 illustrates an example of the structural condition of the PCF according to a second structural example of the high-power optical transmission optical fiber of the embodiment.

FIGS. 8 and 9 illustrate examples of a structural condition of the PCF of the high-power optical transmission optical fiber according to this embodiment. FIGS. 8 and 9 illustrate cases where there are one hole defect and seven hole defects as illustrated in FIGS. 1 and 2, respectively. The drawings illustrate the structural conditions at a wavelength of 1060 nm. A solid line indicates the structural condition that a loss for the LP02 mode is 0.1 dB/m, and the LP02 mode does not propagate in a region under and to the left of the solid line. A broken line indicates the structural condition that the bending loss of the fundamental mode is 1 dB/km with the bending radius R illustrated in the drawing, and it is possible to sufficiently decrease the bending loss for the fundamental mode in a region to the left of the broken line, and obtain a low-loss high-power optical transmission optical fiber and the optical fiber cable 83. Herein, a maximum value of the output light power may increase as an effective cross-sectional area of the fundamental mode expands, and the effective cross-sectional area may be expanded as an inter-hole interval Λ of the PCF increases. Therefore, at an intersection of the solid line and the broken line, the propagation of the LP02 mode and the increase in bending loss may be simultaneously prevented, and the effective cross-sectional area may be maximized with the bending radius corresponding to the broken line.

For example, in FIG. 8, the conditions capable of simultaneously preventing the propagation of the LP02 mode and the increase in the bending loss and maximizing the effective cross-sectional area with the bending radius corresponding to the broken line are as follows. In a case of R=500 mm or smaller, Λ is 60 μm or smaller and d/Λ is 0.78 or smaller. In a case of R=400 mm or smaller, Λ is 55.5 μm or smaller and d/Λ is 0.775 or smaller. In a case of R=300 mm or smaller, Λ is 51 μm or smaller and d/Λ is 0.77 or smaller. In a case of R=200 mm or smaller, Λ is 44 μm or smaller and d/Λ is 0.755 or smaller. In a case of R=140 mm or smaller, Λ is 32 μm or smaller and d/Λ is 0.72 or smaller.

For example, in FIG. 9, the conditions capable of simultaneously preventing the propagation of the LP02 mode and the increase in the bending loss and maximizing the effective cross-sectional area with the bending radius corresponding to the broken line are as follows. In a case of R=500 mm or smaller, Λ is 28.5 μm or smaller and d/Λ is 0.55 or smaller. In a case of R=400 mm or smaller, Λ is 23 μm or smaller and d/Λ is 0.48 or smaller. In a case of R=300 mm or smaller, Λ is 20 μm or smaller and d/Λ is 0.45 or smaller. In a case of R=200 mm or smaller, Λ is 15 μm or smaller and d/Λ is 0.38 or smaller. In a case of R=140 mm or smaller, Λ is 13 μm or smaller and d/Λ is 0.37 or smaller.

Figure 10:
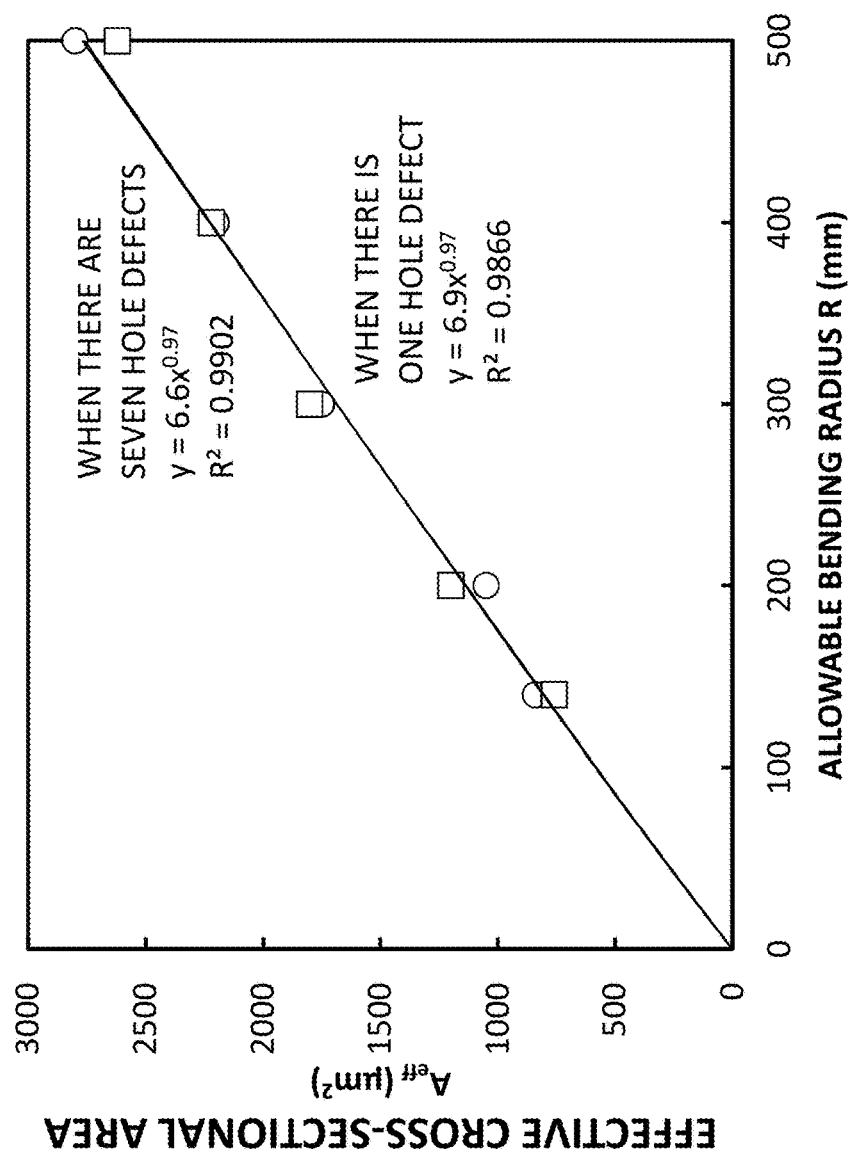
FIG. 10 is a characteristic diagram illustrating an example of a relationship between an allowable bending radius and an effective cross-sectional area according to the high-power optical transmission optical fiber of the embodiment.
Figure 11:
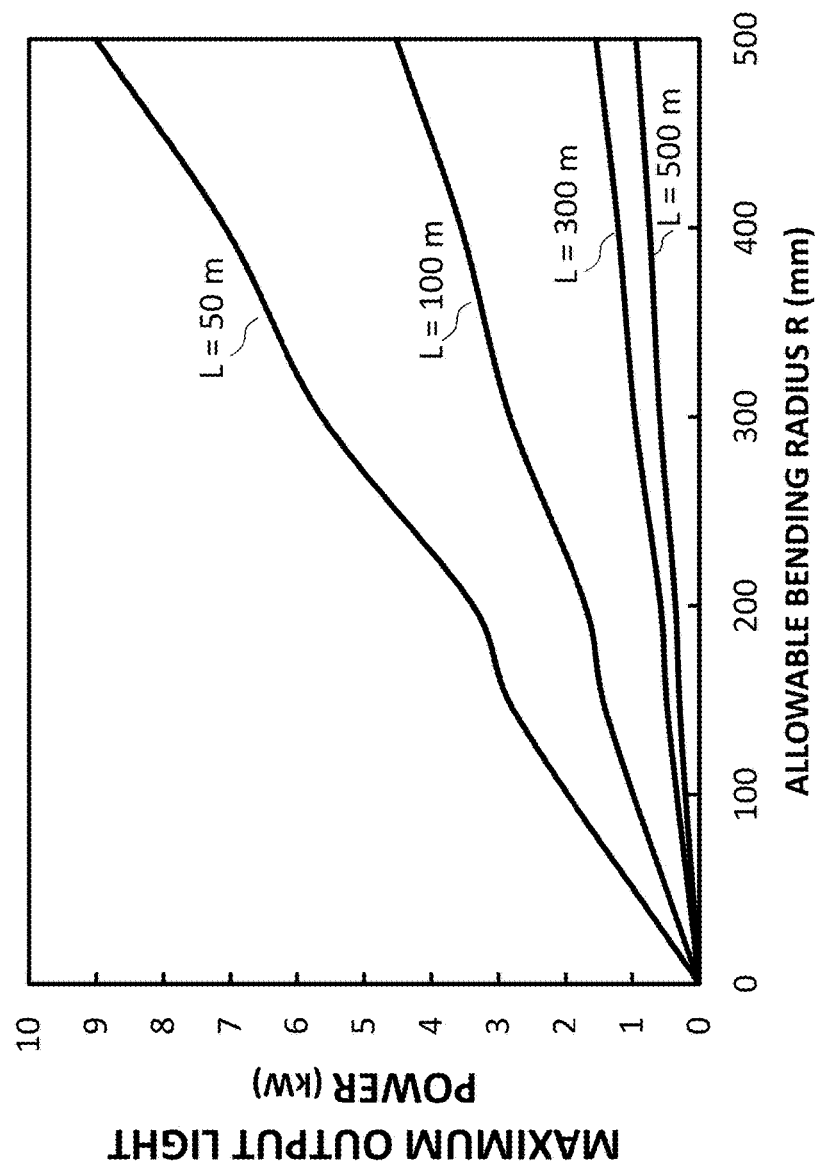
FIG. 11 is a characteristic diagram illustrating an example of a relationship between the allowable bending radius and a maximum output light power according to the high-power optical transmission optical fiber of the embodiment.

FIGS. 10 and 11 illustrate relationships between the effective cross-sectional area and the maximum output light power, and an allowable bending radius of the optical fiber, respectively. In FIG. 10, the effective cross-sectional area is plotted along a vertical axis in which □ represents a case where there are seven hole defects illustrated in FIG. 9, and ○ represents a case where there is one hole defect illustrated in FIG. 8. In FIG. 11, the maximum output light power at each transmission distance is plotted along the vertical axis, in which L represents a transmission distance (m). Results in the drawings correspond to the structures obtained at the intersections of the solid line and the broken line in FIGS. 8 and 9.

From FIG. 10, it is possible to expand an obtained effective cross-sectional area $A_{eff}$ by relaxing the allowable bending radius R; for example, if the allowable bending radius is set to 200 mm or larger, the effective cross-sectional area may be made 1000 μm² or larger.

Also, it is understood from FIG. 10 that there is a certain correlation between the effective cross-sectional area $A_{eff}$ and the allowable bending radius R. For example, a high correlation is obtained when the effective cross-sectional area $A_{eff}$ is represented as
(Expression 1)

$$A_{eff} \leq aR^b \quad (1)$$

using proportional coefficients a and b. Meanwhile, the proportional coefficient b is 1 or smaller.

In FIG. 10, in a case where there is one hole defect, a=6.9 and b=0.97 are satisfied, and where there are seven hole defects, a=6.6 and b=0.97 are satisfied. Also, in FIG. 10, in a region where the allowable bending radius R is 500 mm or smaller, the maximum effective cross-sectional area obtained with respect to the predetermined bending radius is approximately proportional to the allowable bending radius. A correlation coefficient representing approximation accuracy for each is 0.98 or larger, and it is understood that approximation of expression (1) is effective for a design of the PCF in the high-power optical transmission optical fiber 91. Therefore, by using expression (1), it is possible to design a required bending radius for arbitrary output light power, that is, effective cross-sectional area.

Meanwhile, from FIG. 10, the relationship between the allowable bending radius and the effective cross-sectional area is less dependent on the number of hole defects, and as described, a in expression (1) is 6.6 to 6.9, and b is approximately 1.0. From FIG. 11, by using the PCF obtained by the above-described structural design, when considering a transmission distance of approximately 50 m, for example, an output of 1 kW or larger may be obtained even under severe conditions such as the allowable bending radius of 50 mm or smaller, and if the allowable bending radius is increased to 500 mm, an output close to 10 kW may be obtained. By setting the allowable bending radius to approximately 300 mm, it may be confirmed that high-power light of 1 kW or larger may be transmitted over a long distance of 300 m or longer.

Figure 12:
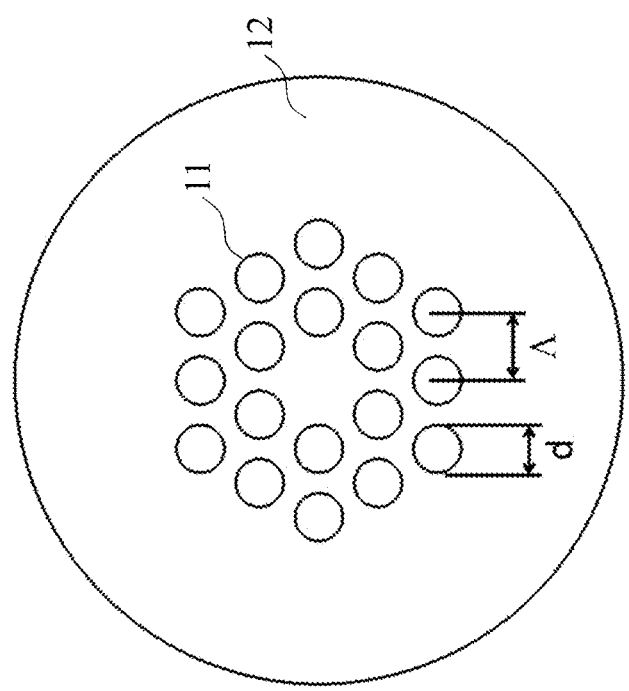
FIG. 12 is a schematic diagram illustrating a third structural example of the high-power optical transmission optical fiber according to the embodiment.
Figure 13:
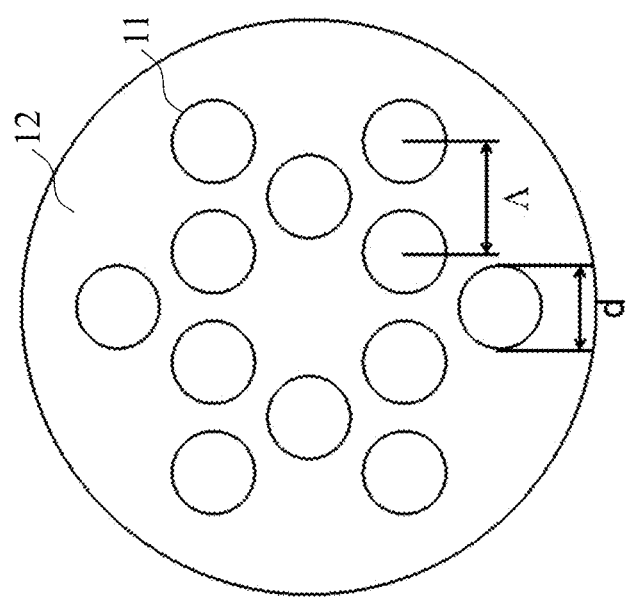
FIG. 13 is a schematic diagram illustrating a fourth structural example of the high-power optical transmission optical fiber according to the embodiment.

FIGS. 12 and 13 illustrate third and fourth structural examples of the high-power optical transmission optical fiber of this embodiment. The third and fourth structural examples illustrate optical fiber structures configured with a small number of holes. In the structures in FIGS. 12 and 13, as in FIG. 1, the core region corresponds to one hole defect, and the numbers of holes are 18 and 12 in FIG. 12 and FIG. 13, respectively. In the photonic crystal fiber, accuracy of positions and sizes of the respective holes affects an optical characteristic, and as the number of holes increases, difficulty in manufacturing and deterioration in yield of the structure become remarkable. In the structures illustrated in FIGS. 12 and 13, since waveguide of the optical wave is realized with a simple structure with 18 or less holes, mass productivity is excellent and controllability in manufacturing of the optical characteristic is improved, so that this is preferable. Meanwhile, in a case of the structure illustrated in FIG. 12, it is possible to transmit high-quality kW class high-power light with M² of 2.0 or smaller in a design range illustrated in FIG. 8.

Figure 14:
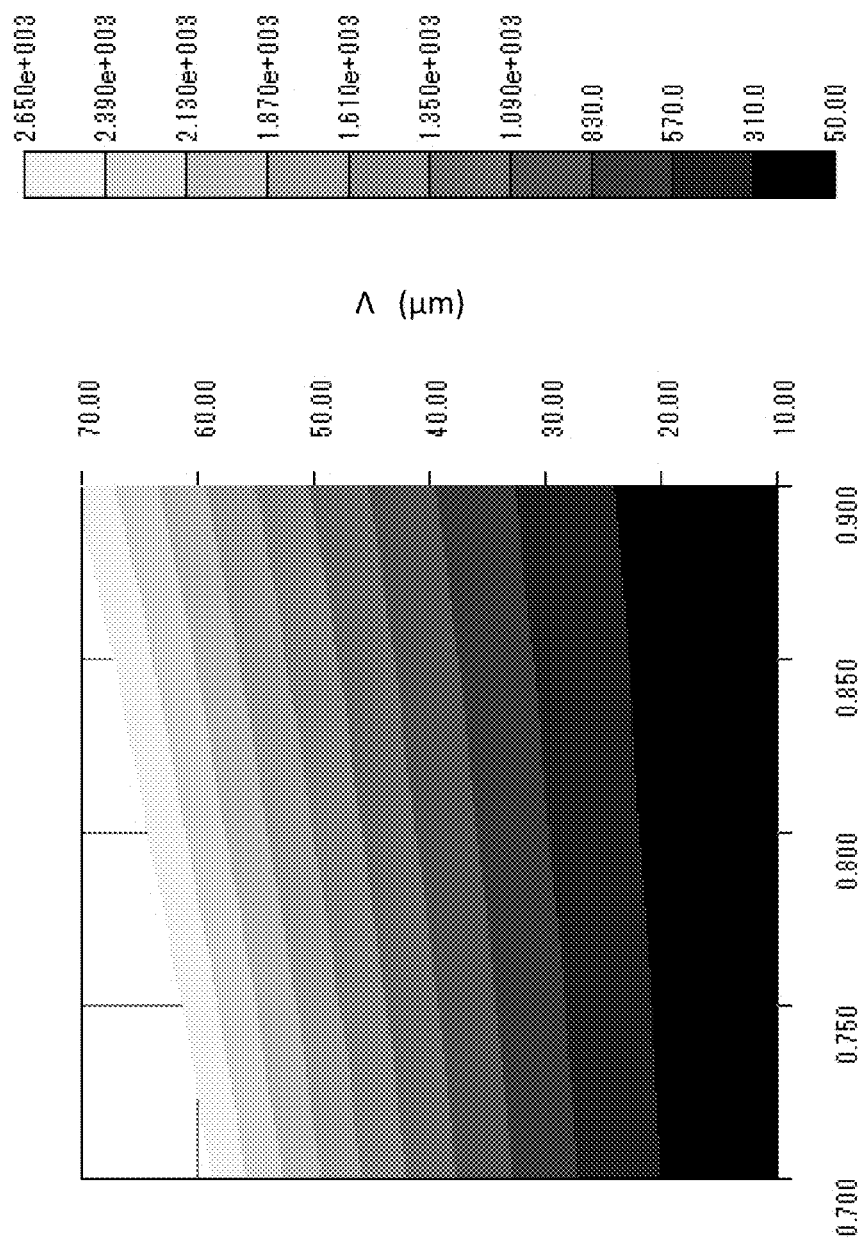
FIG. 14 is a first characteristic diagram of the PCF according to the fourth structural example of the high-power optical transmission optical fiber according to the embodiment.
Figure 15:
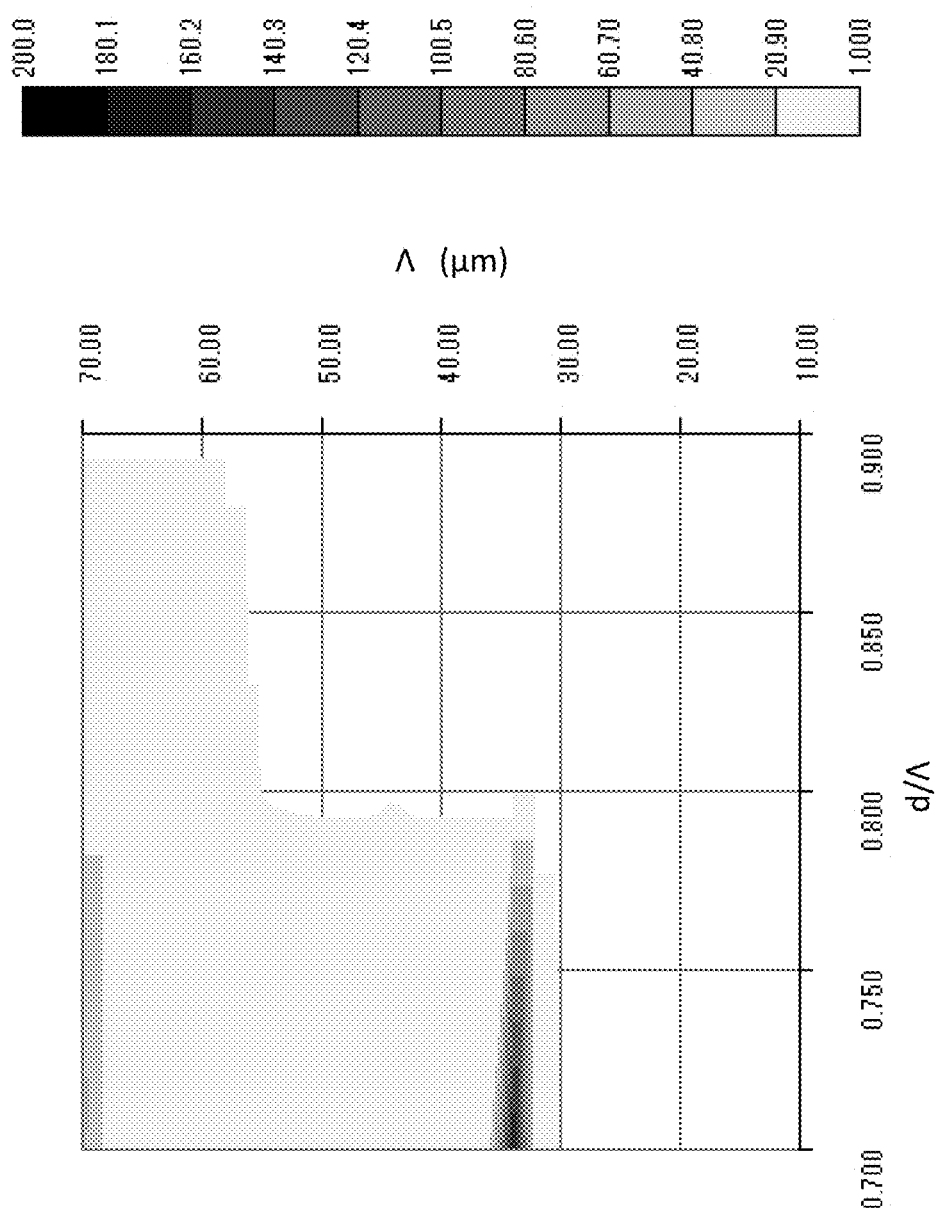
FIG. 15 is a second characteristic diagram of the fourth structural example of the high-power optical transmission optical fiber according to the embodiment.
Figure 16:
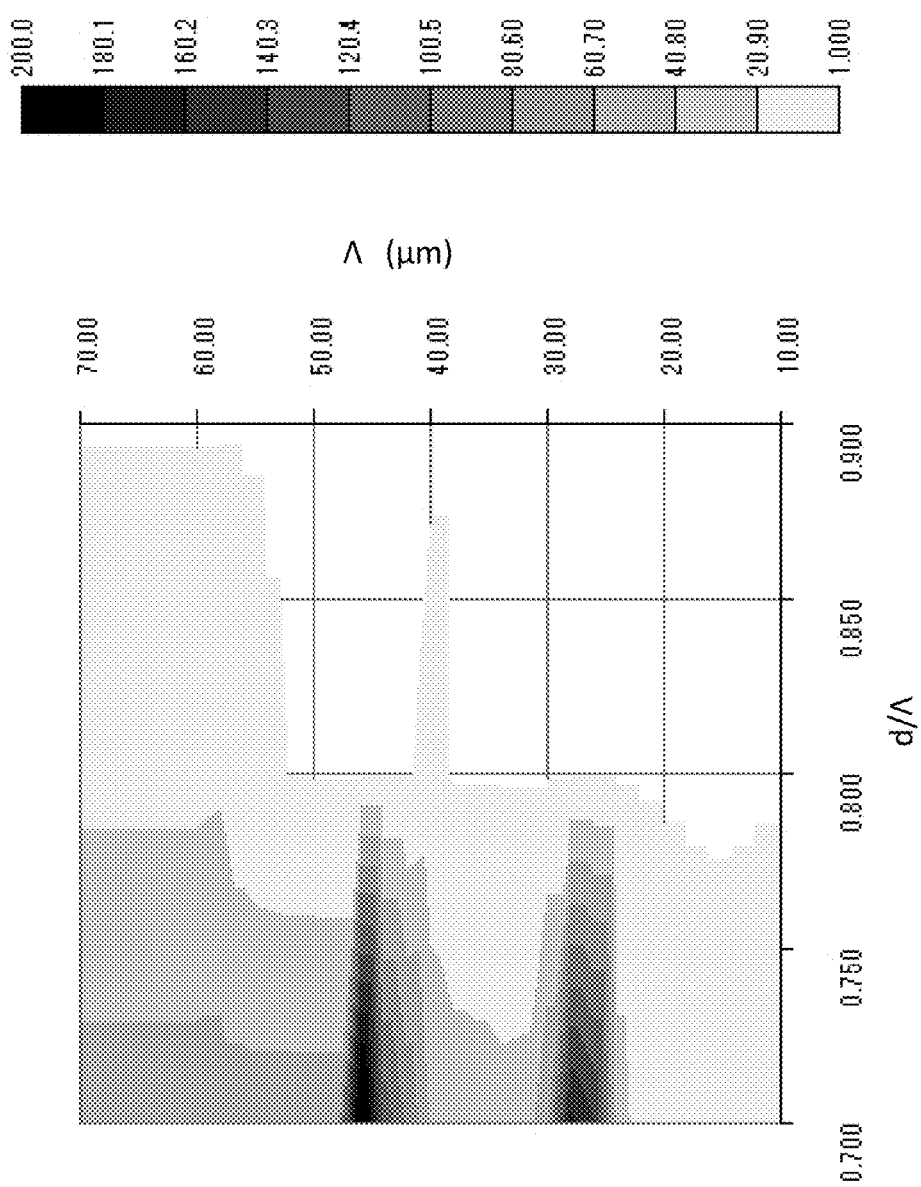
FIG. 16 is a third characteristic diagram of the fourth structural example of the high-power optical transmission optical fiber according to the embodiment.
Figure 17:
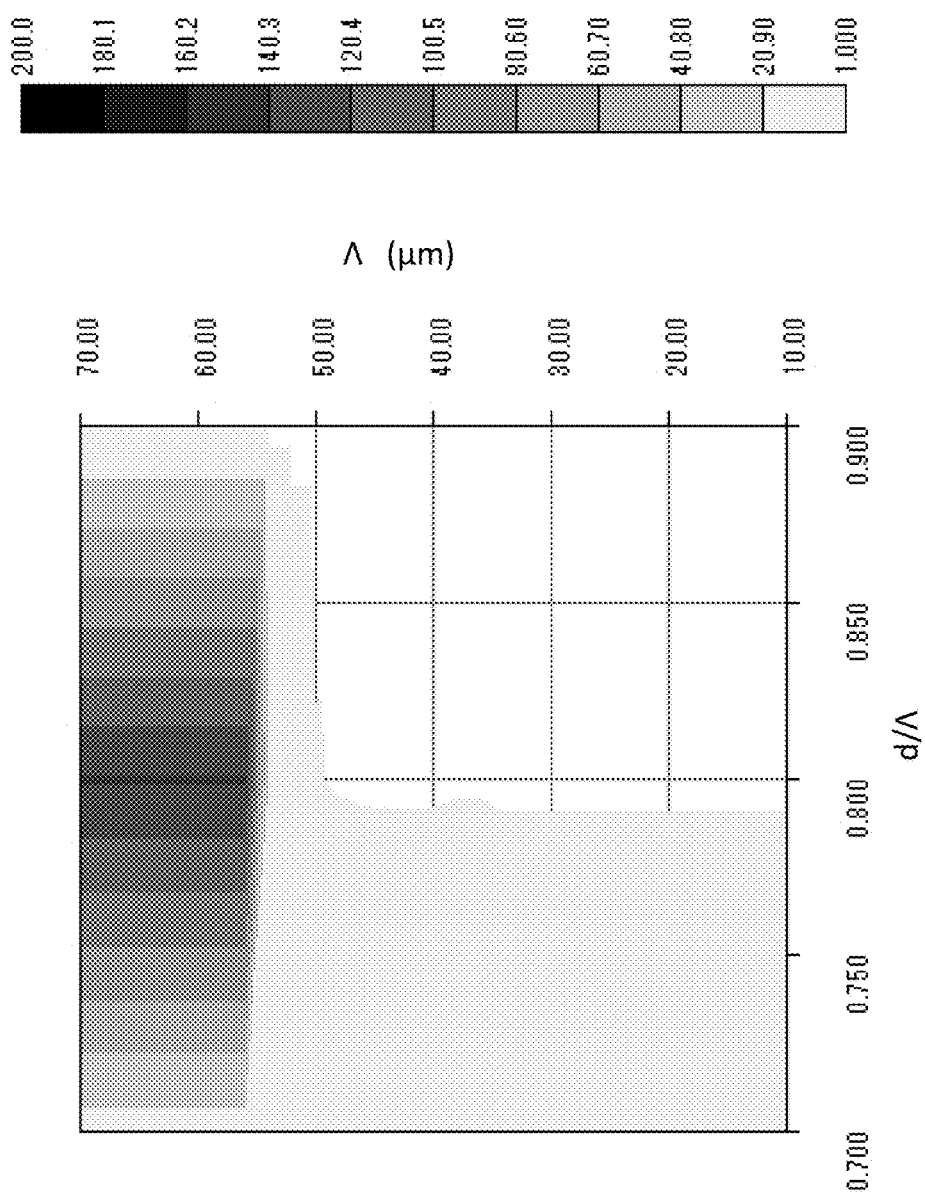
FIG. 17 is a fourth characteristic diagram of the fourth structural example of the high-power optical transmission optical fiber according to the embodiment.

FIGS. 14 to 17 illustrate design examples in a case where the number of holes is set to 12 in the high-power optical transmission optical fiber of this embodiment. FIG. 14 illustrates a structural range in which the bending loss for the fundamental mode is 0.1 dB/m or smaller. FIGS. 15, 16, and 17 illustrate loss values for the LP11 mode, LP21 mode, and LP02 mode, respectively, and the loss of a target mode becomes sufficiently large in a region surrounded by a frame and may be leaked.

Figure 18:
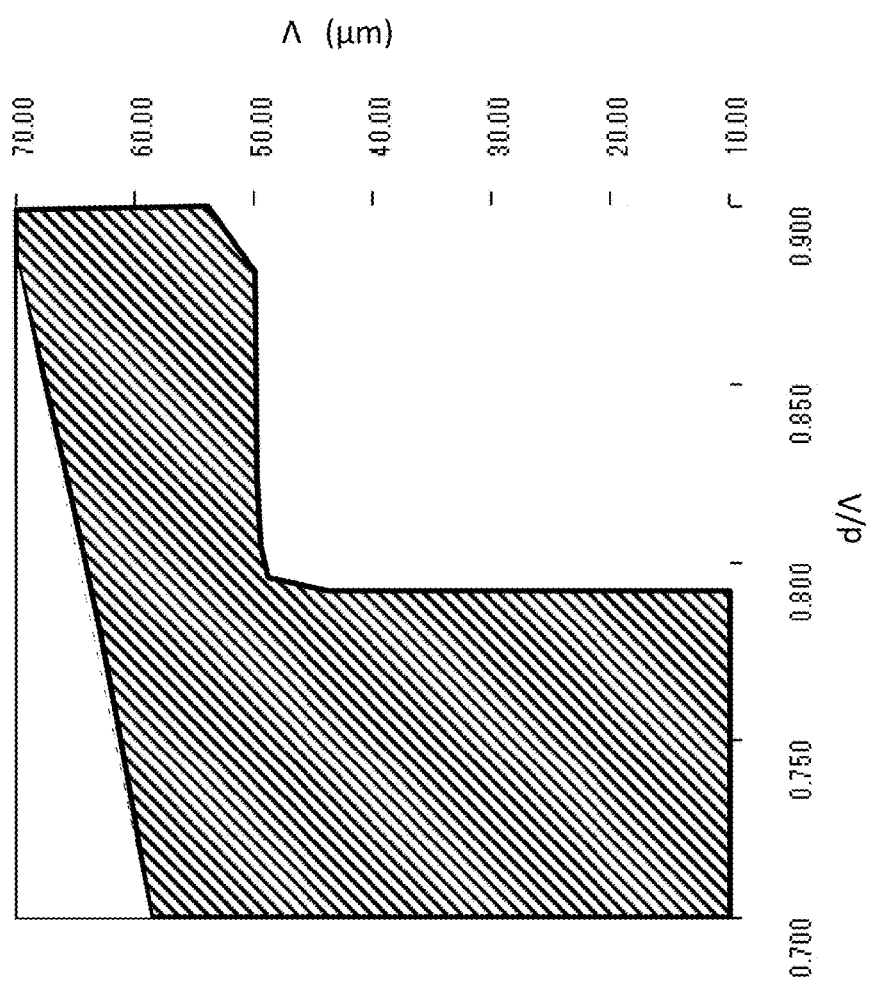
FIG. 18 is a characteristic diagram illustrating an overlapping range of FIGS. 14 and 17.

Herein, as illustrated in FIGS. 5 and 6, by blocking the LP02 mode and setting the axial shift amount between the laser oscillating unit 92 and the high-power optical transmission optical fiber 91 to be a certain value or smaller, high-quality and high-power output light may be obtained. Therefore, the object may be achieved in an overlapping range of FIG. 14 and FIG. 17 illustrated in FIG. 18. That is, a structure in which Λ is 50 μm or larger and 65 μm or smaller and d/Λ is 0.79 or larger and 0.88 or smaller, or Λ is 50 μm or smaller and d/Λ is 0.7 or larger and 0.79 or smaller is suitable. At that time, since the number of holes is as small as 12, yield and manufacturing accuracy in manufacturing are extremely excellent, and the kW class output light with M² of 2.0 or smaller is obtained, so that this is preferable.

Meanwhile, the configuration is such that the predetermined number of modes is three and the LP01 being the fundamental mode and the LP11 and LP21 are propagated but the LP02 is not propagated in this embodiment, but the present disclosure is not limited thereto. For example, the configuration may be such that the predetermined number of modes is two and the LP01 mode and LP11 mode are propagated but the LP21 mode and higher order modes are not propagated. According to this, the effect similar to that of this embodiment may be obtained.

For example, FIGS. 15 and 16 illustrate structures in which the LP11 mode and the LP21 mode leak, respectively, and it is possible to set the number of modes to two by using an overlapping region of FIGS. 14 and 15 and to set the number of modes to three by using an overlapping region of FIGS. 14 and 16. That is, it is possible to set the number of modes to two by making the structure such that Λ is 30 μm or larger and 55 μm or smaller and d/Λ is 0.70 or larger and 0.79 or smaller, or Λ is 55 μm or larger and 65 μm or smaller and d/Λ is 0.79 or larger and 0.83 or smaller, or Λ is 57 μm or larger and 65 μm or smaller and d/Λ is 0.83 or larger and 0.88 or smaller, or Λ is 59 μm or larger and 68 μm or smaller and d/Λ is 0.88 or larger and 0.89 or smaller. It is possible to set the number of modes to three by making the structure such that Λ is 52 μm or larger and 65 μm or smaller and d/Λ is 0.79 or larger and 0.88 or smaller, or Λ is 52 μm or smaller and d/Λ is 0.7 or larger and 0.77 or smaller.

Figure 19:
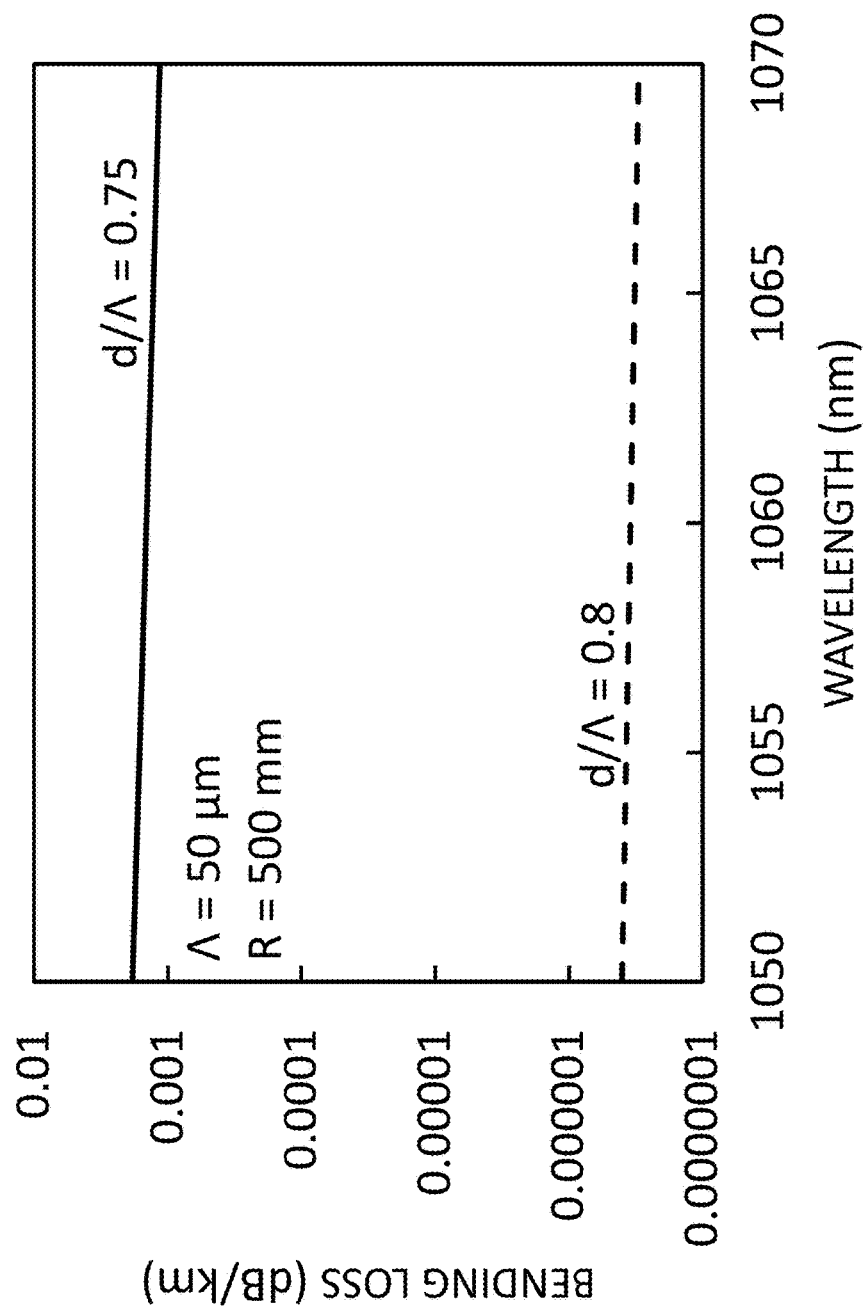
FIG. 19 illustrates an example of wavelength dependency of a bending loss in a case where there is one hole defect.
Figure 20:
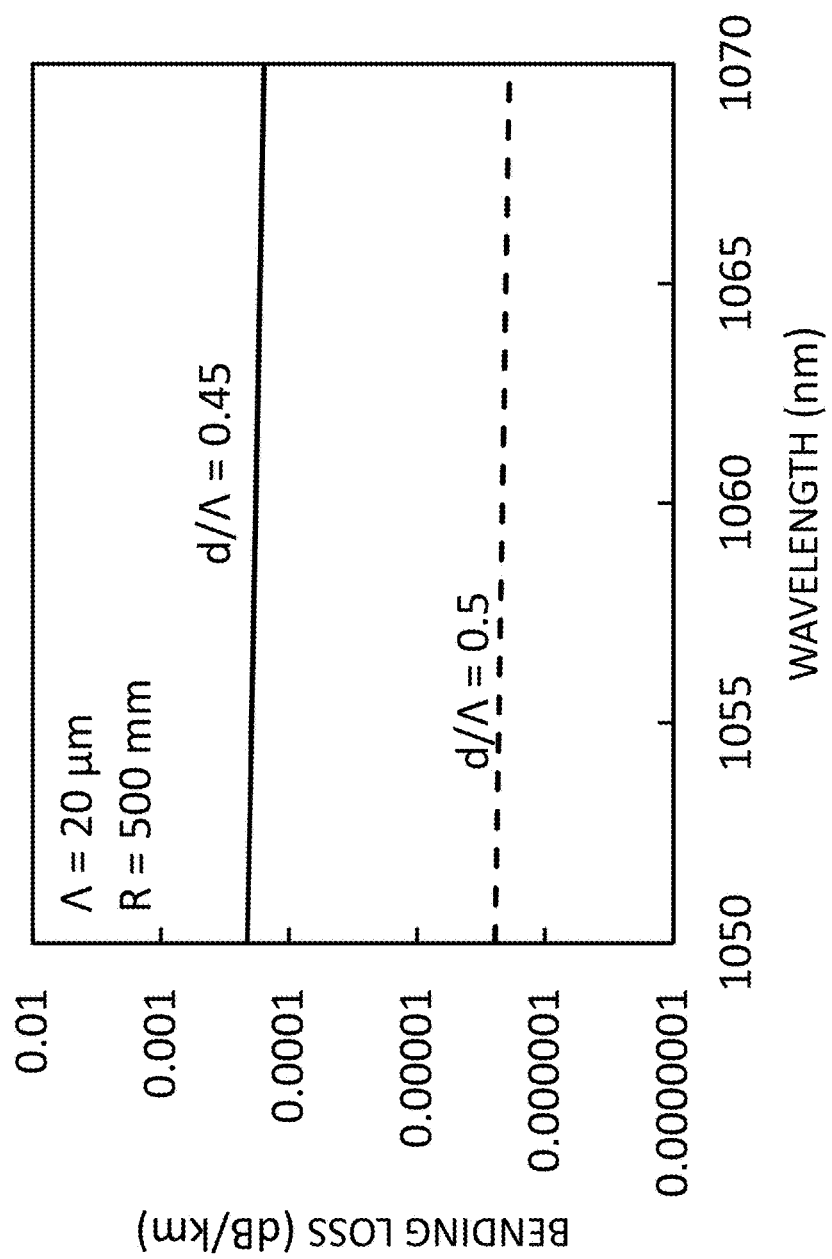
FIG. 20 illustrates an example of the wavelength dependency of the bending loss in a case where there are seven hole defects.

FIGS. 19 and 20 illustrate examples of the bending loss with respect to a wavelength. FIG. 19 illustrates, as an example, a case where Λ of 50.0 μm and d/Λ is 0.75 or 0.8 and the bending radius R of the PCF with one hole defect is set to 500 mm. FIG. 20 illustrates, as an example, a case where Λ is 20.0 μm and d/Λ is 0.45 or 0.8 and the bending radius R of the PCF with seven hole defects is set to 500 mm. It is understood that there is no change in the bending loss between the wavelength of 1060 nm and the wavelength of 1050 nm. For this reason, this embodiment is not limited to the wavelength of 1060 nm exemplified under the structural conditions in FIGS. 8 and 9, and is similarly applicable in a range from the wavelength of 1050 nm or longer to 1070 nm or shorter.

INDUSTRIAL APPLICABILITY

The present disclosure may be used in industrial processing using high-power light.

REFERENCE SIGNS LIST

11 Core
12 Clad
81 High-power optical transmission system
82 Workpiece
83 Optical fiber cable
91 High-power optical transmission optical fiber
92 Laser oscillating unit
93 Lens
94 Coupling unit

What is claimed is:

1. An optical fiber in which a plurality of holes is arranged along a longitudinal direction of the optical fiber and a region surrounded by the plurality of holes is formed as a core region, the optical fiber having:
    a predetermined bending radius determined according to a transmission distance of the optical fiber and light power output from the optical fiber, and
    an inter-hole distance of the plurality of holes and a ratio between a hole diameter of the plurality of holes and the inter-hole distance such that light of a predetermined number of modes is transmitted and a bending loss of light of a fundamental mode with the predetermined bending radius becomes a predetermined value or smaller,
    wherein a and b are coefficients and wherein an effective cross-sectional area $A_{eff}$ of the optical fiber and the predetermined bending radius R have a relationship represented by following expression,
(Expression C1)

$$A_{eff} \leq aR^b,$$

and wherein the predetermined bending radius is 500 mm or smaller,
    a hole defect corresponding to one hole forming the core region is included in the plurality of holes, the inter-hole distance between the plurality of holes is 60 μm or smaller, and the ratio between the hole diameter of the plurality of holes and the inter-hole distance is 0.78 or smaller.

2. The optical fiber according to claim 1, wherein the coefficient a is 6.6 or larger and 6.9 or smaller, and
    the coefficient b is 0.97 or larger.

3. An optical fiber in which a plurality of holes is arranged along a longitudinal direction of the optical fiber and a region surrounded by the plurality of holes is formed as a core region, the optical fiber having:
    a predetermined bending radius determined according to a transmission distance of the optical fiber and light power output from the optical fiber, and
    an inter-hole distance of the plurality of holes and a ratio between a hole diameter of the plurality of holes and the inter-hole distance such that light of a predetermined number of modes is transmitted and a bending loss of light of a fundamental mode with the predetermined bending radius becomes a predetermined value or smaller,
    wherein a and b are coefficients and wherein an effective cross-sectional area $A_{eff}$ of the optical fiber and the predetermined bending radius R have a relationship represented by following expression,
(Expression C1)

$$A_{eff} \leq aR^b,$$

and
    wherein the predetermined bending radius is 500 mm or smaller,
    a hole defect corresponding to seven holes forming the core region is included in the plurality of holes, the inter-hole distance between the plurality of holes is 28.5 μm or smaller, and the ratio between the hole diameter of the plurality of holes and the inter-hole distance is 0.55 or smaller.

4. The optical fiber according to claim 1,
wherein the number of the plurality of holes is 18 or smaller.

5. The optical fiber according to claim 4,
wherein the number of the plurality of holes is 12,
the inter-hole distance between the plurality of holes is 50 μm or larger and 70 μm or smaller, and
the ratio of the hole diameter of the plurality of holes to the inter-hole distance is 0.79 or larger and 0.90 or smaller.

6. The optical fiber according to claim 1,
wherein the light of the predetermined number of modes is the light including a LP01 mode, a LP11 mode, and a LP21 mode but not including a LP02 mode.

7. The optical fiber according to claim 1,
wherein the light of the predetermined number of modes is the light including a LP01 mode and a LP11 mode but not including a LP21 mode and a higher order mode.

8. The optical fiber according to claim 1,
wherein the predetermined value is 1 dB/km.

9. An optical transmission system comprising:
an optical fiber in which a plurality of holes is arranged along a longitudinal direction of the optical fiber and a region surrounded by the plurality of holes is formed as a core region, the optical fiber comprising: a predetermined bending radius determined according to a transmission distance of the optical fiber and light power output from the optical fiber, and an inter-hole distance of the plurality of holes and a ratio between a hole diameter of the plurality of holes and the inter-hole distance such that light of a predetermined number of modes is transmitted and a bending loss of light of a fundamental mode with the predetermined bending radius becomes a predetermined value or smaller;
a light source that emits light transmitted by the optical fiber; and
a coupling unit that sets an axial shift amount between a central axis of emitted light from the light source and a central axis of the core region to 0.95 or smaller with respect to a mode field radius of the optical fiber wherein a and b are coefficients and wherein an effective cross-sectional area $A_{\mathit{eff}}$ of the optical fiber and the predetermined bending radius R have a relationship represented by following expression, (Expression C1)

$$A_{\mathit{eff}} \leq aR^b,$$

and wherein the predetermined bending radius is 500 mm or smaller, a hole defect corresponding to one hole forming the core region is included in the plurality of holes, the inter-hole distance between the plurality of holes is 60 μm or smaller, and the ratio between the hole diameter of the plurality of holes and the inter-hole distance is 0.78 or smaller.

10. The optical transmission system according to claim 9, wherein the coefficient a is 6.6 or larger and 6.9 or smaller, and the coefficient b is 0.97 or larger.

11. An optical transmission system comprising:

an optical fiber in which a plurality of holes is arranged along a longitudinal direction of the optical fiber and a region surrounded by the plurality of holes is formed as a core region, the optical fiber comprising: a predetermined bending radius determined according to a transmission distance of the optical fiber and light power output from the optical fiber, and an inter-hole distance of the plurality of holes and a ratio between a hole diameter of the plurality of holes and the inter-hole distance such that light of a predetermined number of modes is transmitted and a bending loss of light of a fundamental mode with the predetermined bending radius becomes a predetermined value or smaller;

a light source that emits light transmitted by the optical fiber; and a coupling unit that sets an axial shift amount between a central axis of emitted light from the light source and a central axis of the core region to 0.95 or smaller with respect to a mode field radius of the optical fiber wherein a and b are coefficients and wherein an effective cross-sectional area $A_{\mathit{eff}}$ of the optical fiber and the predetermined bending radius R have a relationship represented by following expression, (Expression C1)

$$A_{\mathit{eff}} \leq aR^b,$$

and wherein the predetermined bending radius is 500 mm or smaller, a hole defect corresponding to seven holes forming the core region is included in the plurality of holes, the inter-hole distance between the plurality of holes is 28.5 μm or smaller, and the ratio between the hole diameter of the plurality of holes and the inter-hole distance is 0.55 or smaller.

12. The optical transmission system according to claim 9, wherein the number of the plurality of holes is 18 or smaller.

13. The optical transmission system according to claim 12, wherein the number of the plurality of holes is 12, the inter-hole distance between the plurality of holes is 50 μm or larger and 70 μm or smaller, and the ratio of the hole diameter of the plurality of holes to the inter-hole distance is 0.79 or larger and 0.90 or smaller.

14. The optical transmission system according to claim 9, wherein the light of the predetermined number of modes is the light including a LP01 mode, a LP11 mode, and a LP21 mode but not including a LP02 mode.

15. The optical transmission system according to claim 9, wherein the light of the predetermined number of modes is the light including a LP01 mode and a LP11 mode but not including a LP21 mode and a higher order mode.

16. The optical transmission system according to claim 9, wherein the predetermined value is 1 dB/km.

* * * * *